United States Patent
Lin et al.

(10) Patent No.: US 7,558,429 B2
(45) Date of Patent: Jul. 7, 2009

(54) IMAGE PROCESSING METHOD AND METHOD FOR DETECTING DIFFERENCES BETWEEN DIFFERENT IMAGE MACRO-BLOCKS

(75) Inventors: Chien-Yu Lin, Taipei County (TW); Tzu-Hsin Wang, Hsinchu (TW); Pai-Chu Hsieh, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 717 days.

(21) Appl. No.: 11/161,758

(22) Filed: Aug. 16, 2005

(65) Prior Publication Data

US 2006/0245657 A1    Nov. 2, 2006

(30) Foreign Application Priority Data

Apr. 29, 2005    (TW) .............................. 94113822 A

(51) Int. Cl.
  *G06K 9/36*    (2006.01)
  *G06K 9/46*    (2006.01)
(52) U.S. Cl. .................................................. 382/236
(58) Field of Classification Search ................ 382/218, 382/232, 233, 236, 239, 244; 375/240.01, 375/240.02, 240.12, 240.16, 240.17; 341/67, 341/107
  See application file for complete search history.

(56) References Cited

U.S. PATENT DOCUMENTS

| | | | | |
|---|---|---|---|---|
| 5,241,401 A * | 8/1993 | Fujiwara et al. | ............. | 358/404 |
| 5,748,789 A * | 5/1998 | Lee et al. | ..................... | 382/243 |
| 6,192,148 B1 * | 2/2001 | Lin | ............................. | 382/166 |
| 6,427,027 B1 * | 7/2002 | Suzuki et al. | ............... | 382/236 |
| 6,591,014 B1 * | 7/2003 | Ueda | ........................... | 382/236 |
| 6,625,214 B1 * | 9/2003 | Umehara et al. | ........ | 375/240.12 |
| 6,819,714 B2 * | 11/2004 | Yamada et al. | ......... | 375/240.12 |
| 6,944,224 B2 * | 9/2005 | Zhao et al. | ............. | 375/240.16 |
| 6,993,078 B2 * | 1/2006 | Hall et al. | ............... | 375/240.16 |
| 7,006,698 B2 * | 2/2006 | Adiletta et al. | .............. | 382/236 |
| 7,154,952 B2 * | 12/2006 | Tourapis et al. | ........ | 375/240.16 |
| 7,200,275 B2 * | 4/2007 | Srinivasan et al. | .......... | 382/239 |
| 7,257,157 B2 * | 8/2007 | Cheung | ...................... | 375/240 |
| 7,321,622 B2 * | 1/2008 | Etoh et al. | ................... | 375/240 |
| 2001/0017941 A1 * | 8/2001 | Chaddha | ..................... | 382/236 |

* cited by examiner

*Primary Examiner*—Amir Alavi
(74) *Attorney, Agent, or Firm*—Jianq Chyun IP Office

(57) ABSTRACT

An image processing method and a method for detecting differences between different image macro-blocks are provided. The image processing method includes steps of: providing one of a plurality of macro-blocks of a processed image; performing a method for detecting the differences between the macro-blocks of different images, and there should be at least two images before the processed image in displaying time sequence for obtaining a macro-block difference table; and in the process of image encoding, if the processed image is a P-picture, determining whether the macro-block is a skip mode or not, by reference to the macro-block table in an auxiliary manner.

5 Claims, 3 Drawing Sheets

IMAGE PROCESSING METHOD AND METHOD FOR DETECTING DIFFERENCES BETWEEN DIFFERENT IMAGE MACRO-BLOCKS

CROSS-REFERENCE TO RELATED APPLICATION

This application claims the priority benefit of Taiwan application serial no. 94113822, filed on Apr. 29, 2005. All disclosure of the Taiwan application is incorporated herein by reference.

BACKGROUND OF THE INVENTION

1. Field of the Invention

The present invention relates to an image processing method, and particularly to an image processing method for detecting differences between image macro-blocks at the same position of adjacent images and further judging whether to compress the macro-blocks in a skip mode, by calculating and comparing the pixel differences when inputting images, and a method for detecting differences between different image macro-blocks.

2. Description of Related Art

For the purpose of accelerating the encoding/decoding operation or saving data storage space, in dynamic image compressing technology, not all the images can be entirely encoded. FIG. 1 is a schematic diagram of an image encoding sequence and the coding type of dynamic images; FIG. 2 is a schematic flowchart of a conventional macro-block encoding procedure. Please refer to FIGS. 1 and 2 as an example, wherein the horizontal axis represents the inputting sequence of dynamic images (image displaying sequence). Having no other images for reference, the first image I0 is encoded as an intra pictures (I-pictures) and the next input images B0 and B1 are stored in a memory instead of being processed immediately. After an image P0 is input, it is encoded as predicted pictures (P-pictures), thereafter B0 and B1 are encoded.

During the P-picture encoding process, the steps S205 and S210 are for checking the similarity of the macro-blocks at the same positions of images I0 and P0 for improving the compressing efficiency. If the macro-blocks at the same positions of the two images are similar, the macro-block of image P0 is judged in a skip mode. In other words, when a certain macro-block is judged as a skip mode, the macro-block of the image P0 will skip the encoding step to improve the compressing efficiency (step 215). Therefore, the pixel value of the macro-block will be equal to that of the macro-block at the same position of the image I0 when decoding. Otherwise, the macro-block will be encoded (step 220), if it is not of a skip mode.

When a certain macro-block of the image P0 is determined to be of a skip mode during the above-described P-picture encoding process, in order to improve the compressing efficiency, steps S225 to S230 are performed upon the encoding of all of the following bidirectional pictures (B-pictures) B0 and B1 such that the macro-block of image B0 or B1 which is at the same position with that of image P0 are in a skip mode. In other words, a macro-block of a B-picture will not be encoded (step 235) if the macro-block at the same position of its previous P-picture is of a skip mode; otherwise, a macro-block of the B-picture will be encoded (step 220), if the macro-block at the same position of its previous P-picture is not of a skip mode. When a macro-block of a B-picture is skip mode, the value of which when decoding will be equal to the value of the macro-block at the same position of the previous decoded P-picture. The encoding sequence is performed as below: I0 is the first encoded image, and the succeeding image P1 is encoded. After P-picture P1 is coded, the images B0 and B1 are encoded, then P2 is encoded, following, B-picture of images B2 and B3 are encoded in sequence.

However, although a certain macro-block of image P0 is similar to the macro-block at the same position of image I0, it is not assured that the macro-blocks at the same position of all images (B0 and B1) between images I0 and P0 are similar to the certain macro-block of image P0. Under this circumstance, if the differences between macro-blocks at the same position of images B-picture and P-picture are obvious, the differences between an original image and its corresponding image after compressed by the foregoing conventional technology and then decoded would also be huge; that is, the image would have poor encoding quality.

SUMMARY OF THE INVENTION

It is an object of the present invention to provide an image processing method for properly determining the skip mode of the macro-blocks in a P-picture to produce images with better compressing quality by a calculating analysis in the original images at the image input terminal, during the process of compressing and encoding the macro-blocks.

It is also an object of the present invention to provide a method for detecting the differences between the macro-blocks of different images, wherein the original images are calculated and analyzed at the image input terminal for providing the data of image differences required for image processing.

According to the above and other objects, the present invention provides a method for detecting the differences between the macro-blocks of different images, the method including the steps of: providing a previous image and a current image; comparing the pixel value of the previous image with the pixel value of the corresponding positions of the current image one by one; if a difference between the pixel values reaches a certain predetermined value, determining the above-compared pixels as different; and recording the differences between the current macro-block and the previous macro-block to a macro-block difference table, according to the result of comparing the current image with the previous image.

According to another aspect of the present invention, an image processing method is provided, the method including the steps of: providing one of the image macro-blocks of a processed image; performing the method for detecting the differences between the macro-blocks of different images, and there should be at least two images before the processed image in displaying time sequence for obtaining a macro-block difference table; and in the process of image encoding, the macro-block mode can be determined with reference to the macro-block table in an auxiliary manner to decide whether to set the macro-block as a skip mode or not if the processed image is a P-picture.

According to the present invention, the differences between the macro-blocks at the same position of different images are detected by calculating and comparing the differences between the pixels during the image compressing process, to determine whether to set a skip mode or not. Therefore, the macro-block skip mode of a P-picture can be properly determined accordingly to produce images having better compressing quality. Also, based on the range allowed and the time reserved of the differences between the macro-blocks, quantity-varying B-pictures can be processed accordingly.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
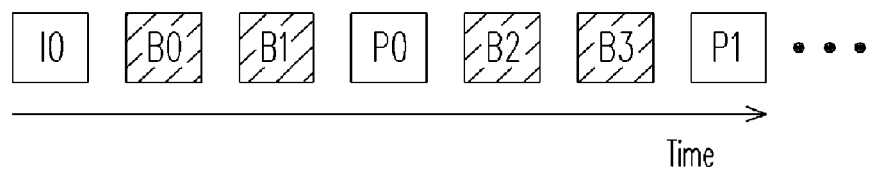
FIG. 1 is a schematic diagram of an image encoding sequence and a processing method of dynamic images.
Figure 2:
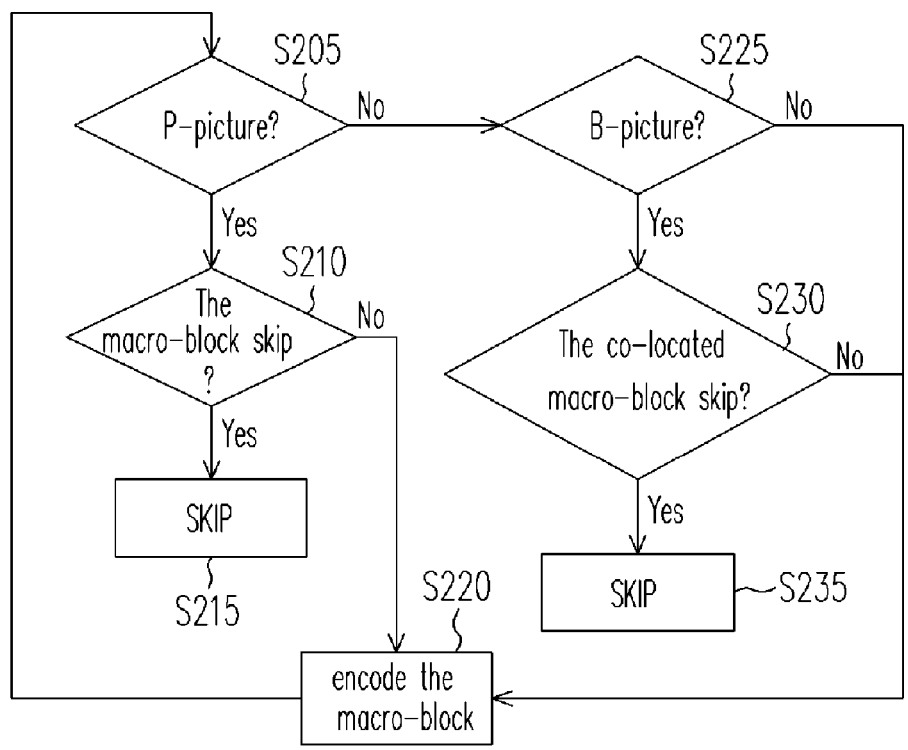
FIG. 2 is a schematic flowchart of a conventional macro-block encoding procedure.

Referring to FIG. 1, based on a fact that a certain macro-block of the image P0 is similar to the macro-block at the same position of the I-picture I0 in image encoding time sequence, it is inferred that the macro-blocks at the same position of images B0 and B1 are similar to the certain macro-block of the image P0 too. Therefore, under some circumstances, the macro-blocks at the same positions of the B-pictures and the P-pictures may be so different that the images displayed after compressed and then decoded may be very different from the original images. In other words, the encoding quality would be bad. Therefore, according to the embodiments to be discussed below, the differences between macro-blocks of different images are detected when inputting images and the result of detection is recorded in a macro-block difference table to be used in the following image processing procedures.

Figure 3:
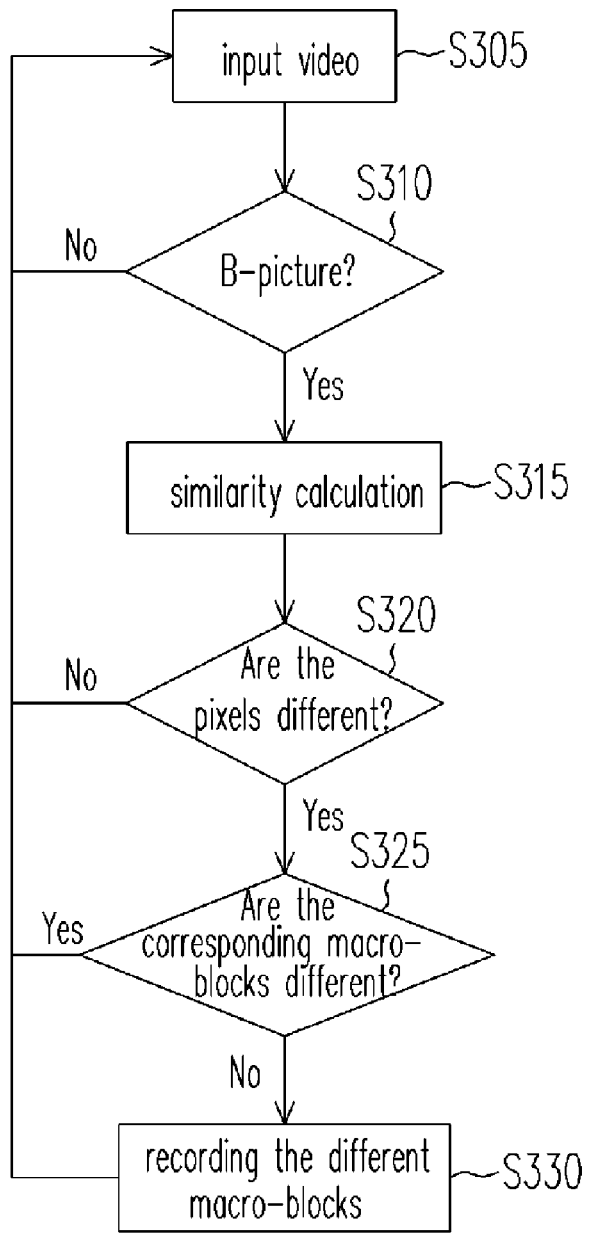
FIG. 3 is a flowchart of a method for detecting the differences between macro-blocks of different images according to the present invention.

FIG. 3 is a flowchart of a method for detecting the differences between macro-blocks of different images according to the present invention. Referring to FIGS. 1 and 3, according to the image displaying time sequence (input time sequence), images I0, B0, B1, P0, B2, B3, P1 . . . etc. are provided (or input) in sequence (step S305). During the process of inputting the above images, it is determined whether the current image is a B-picture (S310). If it is not a B-picture, the step S305 is to be repeated, instead of detecting the differences between the macro-blocks and that of the previous images. If the input current image and the previous image are B-pictures, step S315 is performed.

The similarity between the currently input image and the previously input image is calculated at step S315. For example, the value of all pixels of the current image is compared with the value of the pixels at the corresponding positions of the previous image one by one. Then at step S320, if the difference of pixel value between the current image and the previous image is more than a predetermined value, these two pixels are determined as different. Furthermore, after the comparison between the current image and the previous image, if a macro-block of the current image is judged as having more different pixels than a second predetermined value, the macro-block will be judged as being different from the macro-block at the corresponding position of the previous image. Therefore, provided there is a pixel value difference between the current image and the previous image more than a first predetermined value, the pixels of the above two image are judged as different and a step S325 is to be performed; otherwise, if the pixel value difference between the current image and the previous image has not reached the first determined value, the pixels of the above two image are judged as similar and step S305 is to be performed for inputting the next image.

In step S325, it is determined in the current image whether the macro-blocks judged as different, and the difference information has been recorded in the macro-block difference table. If the macro-blocks have been recorded in the macro-block difference table, step S305 is performed for inputting the next image; otherwise, if the macro-blocks have not been recorded in the macro-block difference table, step S330 is performed for recording the macro-blocks judged as different into the macro-block difference table according to the result of comparing the current macro-blocks and the previous macro-blocks.

Consequently, the macro-block difference table can be used for recording the differences between macro-blocks and the corresponding macro-blocks of the previous images when inputting the images I0, B0 and B1. The data recorded in the macro-block difference table can be provided for the subsequent image processing, such as detecting a scene change, identifying between dynamic images and static images, or determining whether the macro-blocks of image P0 is of a skip mode when it is being processed. Also, another macro-block difference table is obtained by applying the method for detecting the differences between macro-blocks of different images during the process of inputting images B2 and B3. The data recorded by the other macro-block difference table serves as a basis to determine whether the macro-blocks of image P1 is of a skip mode when it is being processed.

Figure 4:
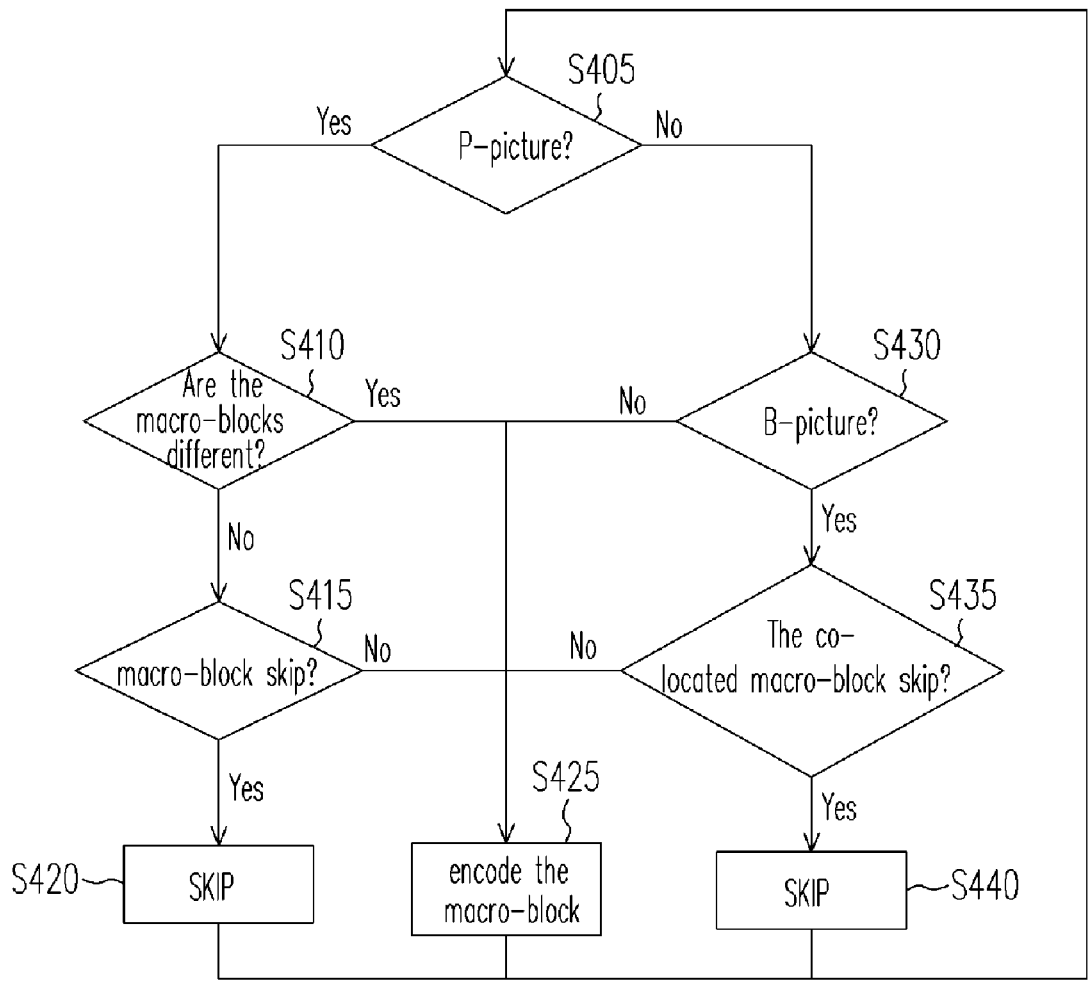
FIG. 4 is a flowchart of an image processing method according to an embodiment of the present invention.

FIG. 4 is a flowchart of an image processing method according to an embodiment of the present invention. The images are processed according to the image encoding time sequence one by one (for example, in a sequence of images I0, P0, B0, B1, P1, B2, B3 as shown in FIG. 1). At step S405, it is determined whether the currently processed image is a P-picture or not, the currently processed image includes a plurality of macro-blocks. If the currently processed image is a P-picture, then go to step S410; otherwise, go to step S430.

At step S410, the method for detecting the differences between the macro-blocks of different images, wherein at least two images before the processed image in displaying time sequence for obtaining a macro-block difference table. Then, in accordance with the above macro-block difference table, it is determined whether each image macro-block of the currently processed image is different or not. If a macro-block is similar, then go to step S415. If a macro-block is different, then go to step S425 for encoding the image macro-block.

In step S415, it is determined whether the image macro-block is a skip mode, according to the coding mode and motion vectors between the current macro-block and the previous macro-block. If the image macro-block is a skip mode, the encoding step is skipped for improving the compressing efficiency (step S420); otherwise, the image macro-block is encoded (step S425). Thereafter, step S405 is repeated to determine whether the image type of next macro-block to be processed is a P-picture or not.

In step S430, if the currently processed image is determined as a B-picture, step S435 will check the skip status of the macro-block at the corresponding position in the previous P-picture, and decide if need to encode current image macro-block. If the image macro-block at the corresponding position in the previous P-picture is a skip mode, the image macro-block will skip the encoding step to improve the compressing efficiency (S440); otherwise, the macro-block will be encoded (S425). The step S405 is repeated for judging whether the image type of next macro-block to be processed is a P-picture.

In summary, the differences between the macro-blocks at the same position of different images are detected by calculating and comparing the differences between the pixels during the image compressing process, so as to determine the macro-block coding mode. Therefore, the macro-block skip mode of a P-picture can be correctly determined to produce images with good compressing quality. Also, based on the range allowed and the time reserved of the differences between the macro-blocks, quantity-varying B-pictures can be processed accordingly.

It should be noted that specific embodiments of, and examples for, the invention are described herein for illustrative purposes, various equivalent modifications are possible within the scope of the invention, as those skilled in the relevant art will recognize that modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An image processing method performed on an image processing apparatus, comprising:
    providing an image macro-block, the image macro-block being one of a plurality of macro-blocks of a processed image;
    performing a method for detecting the differences between the macro-blocks of different images wherein at least two images before the processed image in displaying time sequence are compared for obtaining a macro-block difference table; and
    in the process of image encoding, when the processed image is a P-picture, determining whether to set the macro-block in a skip mode or not, by referring to the macro-block difference table.

2. The image processing method according to claim 1, further comprising:
    when the processed image is the P-picture, determining whether to encode said image macro-block, according to whether the macro-block is set in the skip mode, wherein whether the macro-block is set in the skip mode is determined by referring to the macro-block difference table, the difference table being determined by the processed image and its previous image in an image encoding time sequence.

3. The image processing method according to claim 1, further comprising:
    when the processed image is a B-picture, determining whether to encode said image macro-block, according to whether a macro-block at a position corresponding to said image macro-block in the previous P-picture in an image encoding time sequence is the skip mode.

4. The image processing method according to claim 1, wherein the method for detecting the differences between the macro-blocks of different images comprises:
    providing a previous image and a current image before the processed image in the displaying time sequence;
    comparing the pixel value of the previous image with the pixel value of the corresponding position of the current image, and when a difference of the pixel value between the previous image and the corresponding position of the current image reaches a first predetermined value, determining the pixel value of the previous image and the pixel value of the current image are different; and
    recording the differences between the current macro-block and the previous macro-block in the macro-block difference table, according to the result of comparing the current image with the previous image.

5. The image processing method according to claim 4, wherein recording the differences between the current macro-block and the previous macro-block in the macro-block difference table comprising:
    after the comparison between the current image and the previous image, when the number of the different pixel in the current macro-block of the current image is more than a second predetermined value, determining the current macro-block of the current image is different from the previous macro-block at the corresponding position of the previous image; and
    recording the differences between the current macro-block and the previous macro-block in the macro-block difference table.

* * * * *